(12) United States Patent
Cherukuri et al.

(10) Patent No.: US 6,976,096 B1
(45) Date of Patent: Dec. 13, 2005

(54) METHOD AND APPARATUS FOR CONTROLLING THE ADMISSION OF DATA INTO A NETWORK ELEMENT

(75) Inventors: Ravikrishna V. Cherukuri, San Jose, CA (US); Gregory G. Minshall, Albany, CA (US)

(73) Assignee: Redback Networks Inc., San Jose, CA (US)

( * ) Notice: Subject to any disclaimer, the term of this patent is extended or adjusted under 35 U.S.C. 154(b) by 946 days.

(21) Appl. No.: 09/872,936

(22) Filed: Jun. 2, 2001

(51) Int. Cl.[7] .............................................. G06F 15/16
(52) U.S. Cl. .................... 709/250; 709/249; 370/229; 370/395.21; 370/395.3; 370/395.42
(58) Field of Search ................................ 709/250, 249; 370/229, 395.21, 395.3, 395.42

(56) References Cited

U.S. PATENT DOCUMENTS

| | | | |
|---|---|---|---|
| 4,667,324 A | 5/1987 | Graves | |
| 4,736,363 A | 4/1988 | Aubin et al. | |
| 5,159,595 A | 10/1992 | Flanagan et al. | |
| 5,608,733 A | 3/1997 | Vallee et al. | |
| 6,205,142 B1 | 3/2001 | Vallee | |
| 6,445,709 B1 * | 9/2002 | Chiang | 370/399 |
| 6,584,122 B1 * | 6/2003 | Matthews et al. | 370/493 |
| 6,717,951 B2 * | 4/2004 | Stanton et al. | 370/418 |
| 6,782,428 B1 * | 8/2004 | Gleeson et al. | 709/233 |
| 6,847,620 B1 * | 1/2005 | Meier | 370/328 |
| 6,859,438 B2 * | 2/2005 | Haddock et al. | 370/235 |
| 6,862,280 B1 * | 3/2005 | Bertagna | 370/392 |
| 2002/0146013 A1 * | 10/2002 | Karlsson et al. | 370/395.6 |
| 2002/0181484 A1 * | 12/2002 | Aimoto et al. | 370/413 |
| 2003/0081624 A1 * | 5/2003 | Aggarwal et al. | 370/412 |
| 2004/0076154 A1 * | 4/2004 | Mizutani et al. | 370/389 |
| 2004/0076161 A1 * | 4/2004 | Lavian et al. | 370/395.41 |

OTHER PUBLICATIONS

P.K. Jha, "Bandwidth Maximization for SONET-SDH and Direct Data over Optical Networks," http://www.isoc.org/inet2000/cdproceedings/1g/1g_3.htm, pp. 1-26, Nov. 16, 2000.

* cited by examiner

*Primary Examiner*—Kim Huynh
*Assistant Examiner*—David Martinez
(74) *Attorney, Agent, or Firm*—Blakely, Sokoloff, Taylor & Zafman

(57) ABSTRACT

A method and apparatus for controlling the admission of data packets into a network element is described. In an embodiment, a method for controlling admittance of a data packet into a memory buffer includes performing, prior to queuing the data packet for routing by a processor, the following: (1) receiving a data packet from one of at least two different ports, (2) determining a priority value within the data packet, and (3) determining an admittance group identifier for the data packet based on the priority value and the port the data packet was received. The method also comprises queuing the data packet from the memory buffer to one of a number of queues for routing by the processor upon determining that a number of data packets stored in the memory buffer and having the admittance group identifier is not greater than a threshold value.

26 Claims, 7 Drawing Sheets

METHOD AND APPARATUS FOR CONTROLLING THE ADMISSION OF DATA INTO A NETWORK ELEMENT

FIELD OF THE INVENTION

The invention relates to the field of communications. More specifically, the invention relates to controlling the admission of data into a network element.

BACKGROUND OF THE INVENTION

Within the field of communications, the need for high-speed transmission of data has continued to increase, as customers continue to need more bandwidth to satisfy the growing needs. Moreover, in addition to the demand for higher bandwidth, there has also been an increased need for various types of services that employ different protocols. For example, certain customers (e.g., companies providing voice services) of high-speed networks want to operate on a Time Division Multiplexing (TDM) Network, which combines different data streams, such as voice traffic, such that each data stream is assigned a time slot within the combined data stream. Moreover, other customers of high-speed networks may desire to transport data employing packet-based data streams, which do not have dedicated timeslots to given packets. Examples of the types of packets that can be placed into such data streams can include Asynchronous Transfer Mode (ATM), Internet Protocol (IP), Frame Relay, voice over IP and Point-to-Point Protocol (PPP), Multi-Protocol Label Switching (MPLS) or Ethernet.

Additionally, Quality of Service (QoS) requirements are now being employed to determine which data packets have higher priority for use of the data bandwidth within a network. In particular, QoS values are priority values attached to the packets of data being transmitted across the network. Accordingly, in the event that data packets must be dropped, due for example to network congestion, those data packets having a lower QoS value are dropped before data packets having a higher QoS value. For example, data traffic related to a business letter generated by a word processing application could have a higher priority than data traffic related to general Internet web browsing. Further, certain customers could pay to have their data traffic upgraded to a higher priority.

Disadvantageously in current systems, even though lower priority data traffic is eventually dropped during times of network congestion, such traffic still consumes network resources, such as memory and processors, in order to categorize and prioritize the data traffic being received within a given network element. For example, in a typical system, a network element would attempt to receive and buffer all of the data packets into memory, perform full classification of the received packets and then drop those packets of lowest priority.

One problem with this type of system is that it may be subject to network attacks, which involves the transmitting of a large number of packets to the targeted network elements, thereby "bogging" the system as attempts are made to receive, buffer and classify all of the data packets. While under a network attack, the network element may not have enough memory space to buffer all of these "attack" packets, thereby resulting in the loss of packets (including valid packets that are not related to the network attack). Moreover even absent a network attack, in such systems the higher priority data traffic are subject to being lost if the lower priority data traffic consumes the network resources, such as the memory buffer space, as data packets are dropped when the memory buffer space is exceeded.

SUMMARY OF THE INVENTION

A method and apparatus for controlling the admission of data packets into a network element is described. In an embodiment, a method for controlling admittance of a data packet into a memory buffer includes performing, prior to queuing the data packet for routing by a processor, the following: (1) receiving a data packet from one of at least two different ports, (2) determining a priority value within the data packet, and (3) determining an admittance group identifier for the data packet based on the priority value and the port the data packet was received. The method also comprises queuing the data packet from the memory buffer to one of a number of queues for routing by the processor upon determining that a number of data packets stored in the memory buffer and having the admittance group identifier is not greater than a threshold value.

In one embodiment, an apparatus comprises preclassification circuitry coupled to receive a number of data packets from a number of ports. The preclassification circuitry is to determine a priority value for each of the number of data packets. The apparatus also includes control circuitry coupled to the preclassification circuitry. Additionally, the apparatus comprises a memory buffer coupled to the control circuitry. The apparatus includes a number of queues coupled to a number of processors, wherein the control circuitry is to queue a data packet of the number of data packets into the number of queues from the memory buffer upon determining that a number of the data packets stored in the memory buffer, which are received on the port that the that the data packet is received and have a priority value that equals the priority value of the data packet, has not exceeded a threshold value.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, system 100 can be located in FIG. 1. However, element numbers are the same for those elements that are the same across different Figures.

In the drawings.

DETAILED DESCRIPTION

A method and apparatus for controlling the admission of data packets into a network element are described. In the following description, for purposes of explanation, numerous specific details are set forth in order to provide a thorough understanding of the present invention. It will be evident, however, to one skilled in the art that the present invention may be practiced without these specific details.

System Description

Figure 1:
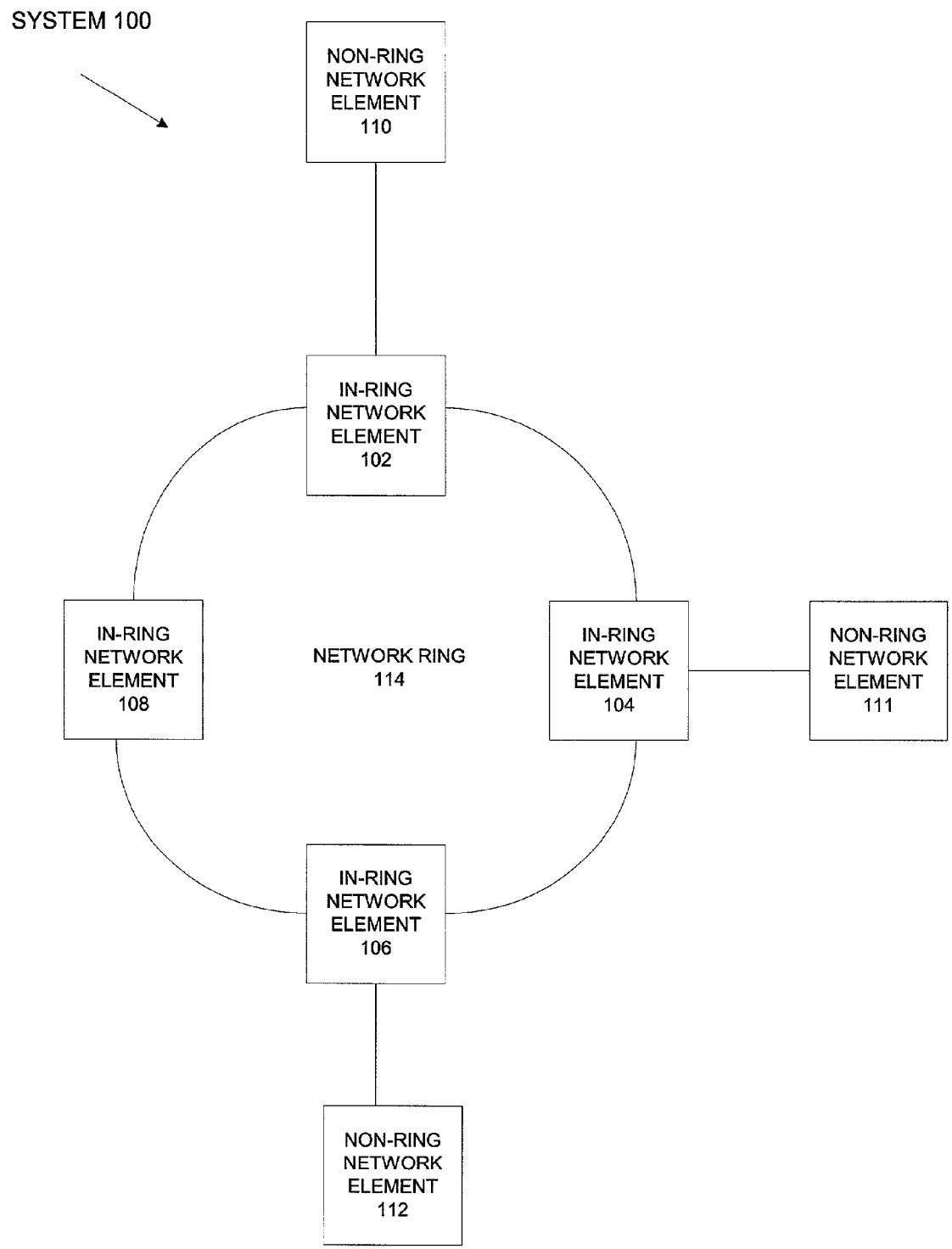
FIG. 1 is block diagram illustrating a system that incorporates embodiments of the present invention.

FIG. 1 is block diagram illustrating a system that incorporates embodiments of the present invention. In particular, FIG. 1 illustrates system 100 that includes network ring 114, which is comprised of in-ring network element 102, in-ring network element 104, in-ring network element 106 and in-ring network element 108. System 100 also include non-ring network element 110, non-ring element 111 and non-ring network element 112, which are coupled to network ring 114 through in-ring network element 102, in-ring network element 104 and in-ring network element 106, respectively. In an embodiment, network elements 102–112 can be routers, switches, bridges or other types of network element that process data.

In one embodiment, the connection among in-ring network element 102, in-ring network element 104, in-ring network element 106 and in-ring network element 108 allow for bi-directional traffic. Accordingly, this bidirectional capability allows for redundancy in the communication between the different network elements, such that if a given line of communication is lost, the data traffic to be transmitted thereon can be rerouted in the opposite direction to reach its intended destination within the ring architecture.

In an embodiment, system 100 transmits data traffic among the different network elements, both in-ring and non-ring, employing the Synchronous Optical Network (SONET) standard or Synchronous Digital Hierarchy (SDH). However, embodiments of the present invention are not so limited, as data traffic among the different network elements can be transferred using other types of transmission standards. Examples of other types of transmission standards can include, but are not limited to, T1, T3, Data Signal (DS)3 and DS1 signals. In one embodiment, data traffic among in-ring network element 102, in-ring network element 104, in-ring network element 106 and in-ring network element 108 includes TDM traffic and packet traffic within a same Time Division Multiplexing (TDM) signal. In an embodiment, the SONET/SDH standard is employed for in-ring communications, while a DS3 and/or DS 1 standard is employed for non-ring communications.

In this ring network, network elements are used that can transmit and receive TDM ring traffic. In addition, at least certain of the network elements provide two different switching techniques—TDM and packet. The packet switching provided can support any number of protocols including layer 2 and layer 3 type protocols such as ATM, Ethernet, Frame Relay, IP and MPLS, etc. In addition to typical operations of a TDM network element, the network elements are implemented to be able to programmably select on a TDM-timeslot basis certain of the incoming TDM traffic to be extracted and packet switched rather than TDM switched. Regardless of which switching technique is used, the switched traffic going back onto the ring is put in TDM format and transmitted out. However, each time traffic is packet switched, that traffic can be statistically multiplexed. A further description of the operation of system 100 and the network elements therein is described in more detail below.

The architecture and configuration of system 100 is by way of example and not by way of limitation, as embodiments of the present invention can be incorporated in other types of systems. For example, other such systems could incorporate less or more network elements into the network ring and/or network elements attached thereto. Moreover, embodiments of the present invention are not limited to the network ring architecture as illustrated in FIG. 1. Examples of other types of network architectures that can incorporate embodiments of the present invention include, but are not limited to, a point-to-point configuration, point-to-multipoint configuration, a hub configuration and/or different types of mesh topologies. In addition, embodiments of the present invention are not limited to TDM networks, but also applies to Wave Division Multiplexing (WDM) networks.

Network Element Description

Figure 2:
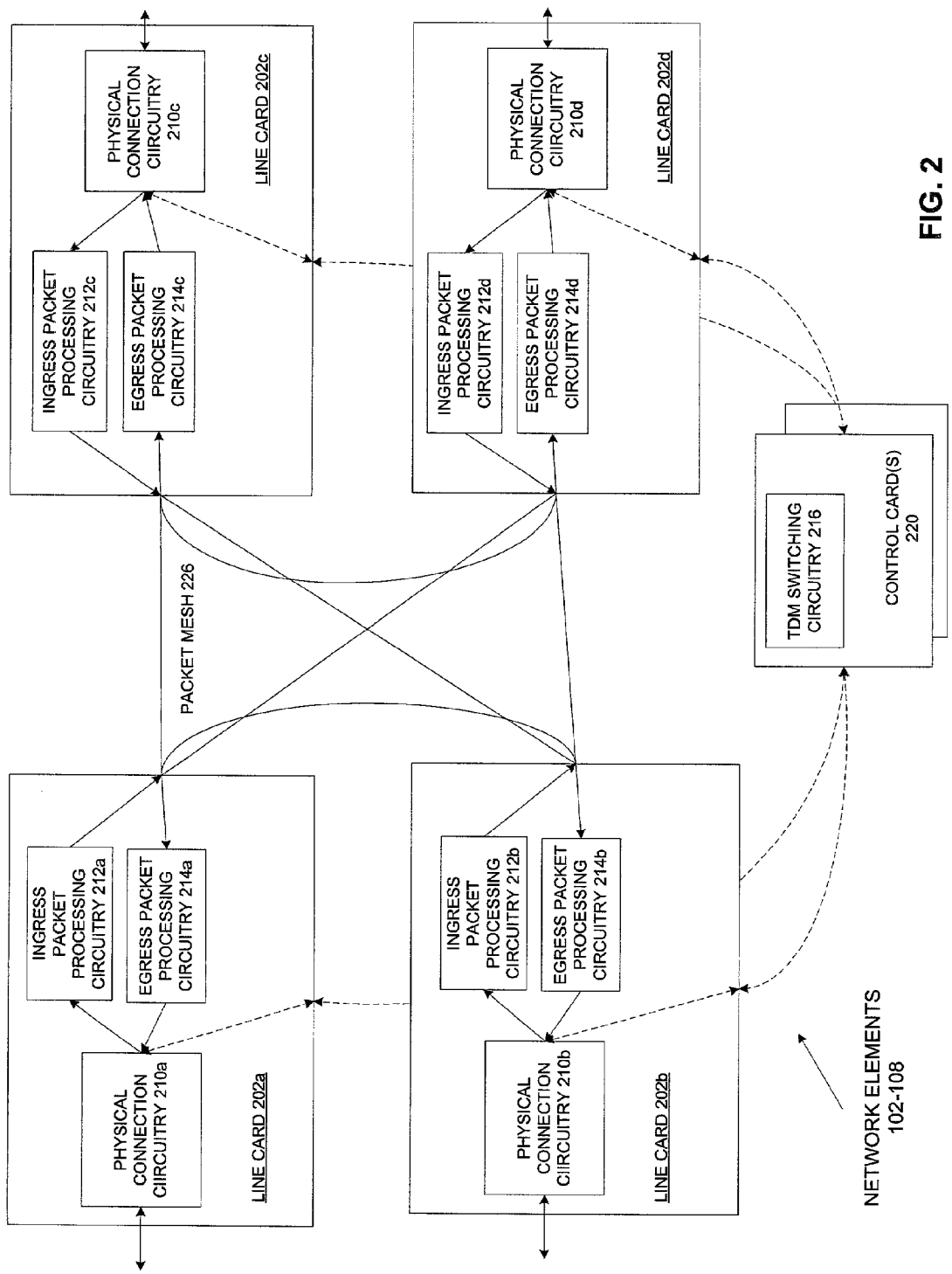
FIG. 2 illustrates portions of in-ring network elements 102–108, according to embodiments of the present invention.

FIG. 2 illustrates portions of in-ring network elements 102–108 (for purposes of FIG. 2, hereinafter "network element 102"), according to embodiments of the present invention. As shown, network element 102 includes line cards 202a–d and control card(s) 220, such that control card(s) 220 are coupled to each of line cards 202a–d. The number of line cards illustrated are for the sake of simplicity and not by way of limitation, as a lesser or greater number of line cards can be included within network element 102. Additionally, network element 102 includes a first switch fabric, packet mesh 226, which includes a full mesh such that each of line cards 202a –d are coupled to one another. For example, line card 202a is coupled to line cards 202b–d through packet mesh 226. However, embodiments of the present invention are not limited to a full mesh for the transmission of packets among line cards 202a–d, as any type of switching method that switches based on the addressing scheme described herein can be incorporated into embodiments of the present invention. For example, in one embodiment, line cards 202a–d could be coupled together using a switch fabric, such that the line cards are coupled to a packet switch card, which provides for the switching therein.

Line cards 202a–d include physical connection circuitry 210a–d, ingress packet processing circuitry 212a–d and egress packet processing 214a–d, respectively. Physical connection circuitry 210a–d can be coupled to lines external to network element 102, as shown, which can carry optical and/or electrical signals, which is described in more detail below in conjunction with FIG. 7. In one embodiment, line cards 202a–d of network element 102 may be connected to an optical line transmitting SONET OC-N signals. Moreover, in an embodiment, line cards 202a–d of network element 102 may be connected to an electrical line such as a T1, T3, E1, E3, Ethernet, Gigabit Ethernet, etc. However, embodiments of the present invention are not limited to the above-described examples, as any other type of optical or electrical data transmission can be incorporated into embodiments of the present invention. Additionally, control cards(s) 220 include TDM switching circuitry 216. This is by way of example and not by way of limitation, as TDM switching circuitry 216 can be placed in other locations. For example, in an embodiment, TDM switching circuitry 216 is located on a separate card, apart from control card(s) 220.

In an embodiment, each line card 202a–d can be coupled to four optical and/or electrical lines. In another embodiment, each line card 202a–d can be coupled to eight optical and/or electrical lines. However, embodiments of the present invention are not so limited, as a lesser or greater number of optical and/or electrical lines can be coupled to network element 102 through line cards 202a–d. Additionally, physical connection circuitry 210a–d are coupled to ingress packet processing circuitry 212a–d, respectively, such that packet data being received from the optical and/or electrical lines is passed from physical connection circuitry 210a–d to ingress packet processing circuitry 212a–d, respectively. In one embodiment, the packet data is extracted from a TDM signal, which is described in more detail below.

Ingress packet processing circuitry 212a–d is coupled to packet mesh 226. Accordingly, each ingress packet processing circuitry 212a–d is coupled to each egress packet processing circuitry 214a–d, respectively, on line cards 202a–d through packet mesh 226. Moreover, egress packet processing circuitry 214a–d is respectively coupled to physical connection circuitry 210a–d, such that packet data traffic coming in from packet mesh 226 from ingress packet processing circuitry 212a–d is transmitted from egress packet processing circuitry 214a–d to physical connection circuitry 210a–d, respectively.

Line cards incorporated into embodiments of the present invention are not limited to those illustrated by line cards 202a–d. Moreover, the network elements can have different line card configurations from that shown by line cards 202a–d. For example, a given in-ring network element could be limited to a single line card that can receive and transmit TDM traffic(which may include packet traffic) within network ring 114, employing multiple interfaces for the receipt and transmittal of TDM traffic. In another embodiment, a given in-ring network element can include a first line card to receive TDM traffic (which may include packet traffic) from another in-ring element, while a second line card can transmit TDM traffic to another or same in-ring network element. In one such embodiment, a third line card can be incorporated into this given in-ring network element to add, drop and transmit different types of traffic including different types of packet traffic, such as ATM, Frame Relay, IP, etc, received and transmitted to a non-ring network element. In another embodiment, a given network element may include a single line card with multiple interfaces such that a first interface receives TDM traffic from another in-ring network element, a second interface transmits TDM traffic to another in-ring network element and a third interface adds, drops and transmits traffic, such as packet traffic to a non-ring network element. A network element may be connected to multiple rings, either using multiple sets of line cards or multiple interfaces on one set of line cards.

Accordingly, a line card is used either to connect to an in-ring network element to form part of the ring, or to provide communication with out-of ring network elements. To provide some examples with regard to a line card connected with an out-of-ring network element: 1) layer 2/3 traffic from out-of-ring network element can come in, go through the packet mesh to a line card connected to an in-ring network element, and then out onto the ring being carried by a SONET frame; 2) layer 2/3 traffic coming from an out-of-ring network element can be de-mapped into SONET, go through the TDM switch fabric to a line card connected to an in-ring network element, and then out onto the ring being carried by a SONET frame; 3) TDM traffic coming from an out-of-ring network element can come in, go through the TDM switch fabric to a line card connected to an in-ring network element, and then out onto the ring being carried by a SONET frame; 4) TDM traffic coming from an out-of-ring network element carrying layer 2/3 traffic can be processed to extract the layer 2/3 traffic, with the layer 2/3 traffic going through the packet mesh to a line card connected to an in-ring network element, and then out onto the ring carried by a SONET frame; 5) layer 2/3 traffic coming from an out-of-ring network element can go through the packet mesh to a line card connected to an out-of-ring network element, and then go out of the ring being carried by the protocol of the interface of that egress line card; etc. Traffic flows can be full duplex. Accordingly, for each example, there is a corresponding in-ring to out-of-ring capability.

With regard to the TDM traffic, a second switch fabric (in addition to packet mesh 226) is formed among line cards 202a–d and TDM switching circuitry 216 of control cards 220, as illustrated by the dashed lines in FIG. 2. In particular, physical connection circuitry 210a–d is coupled to TDM switching circuitry 216 for the receiving and transmitting of TDM traffic into and out of network element 102. Accordingly, TDM switching circuitry 216 receive TDM traffic from physical connection circuitry 210a–d and switches this traffic to any of physical connection circuitry 210a–d, based on configuration data for the timeslots of the TDM traffic. For example, TDM switching circuitry 216 could be configured such that data within the first ten timeslots of a TDM signal, such as a SONET/SDH signal, received on a first interface of physical connection circuitry 210a are forwarded out the first ten timeslots of a TDM signal being transmitted out from a first interface of physical connection circuitry 210d.

Operation of Packet Processing Circuitry

Figure 3:
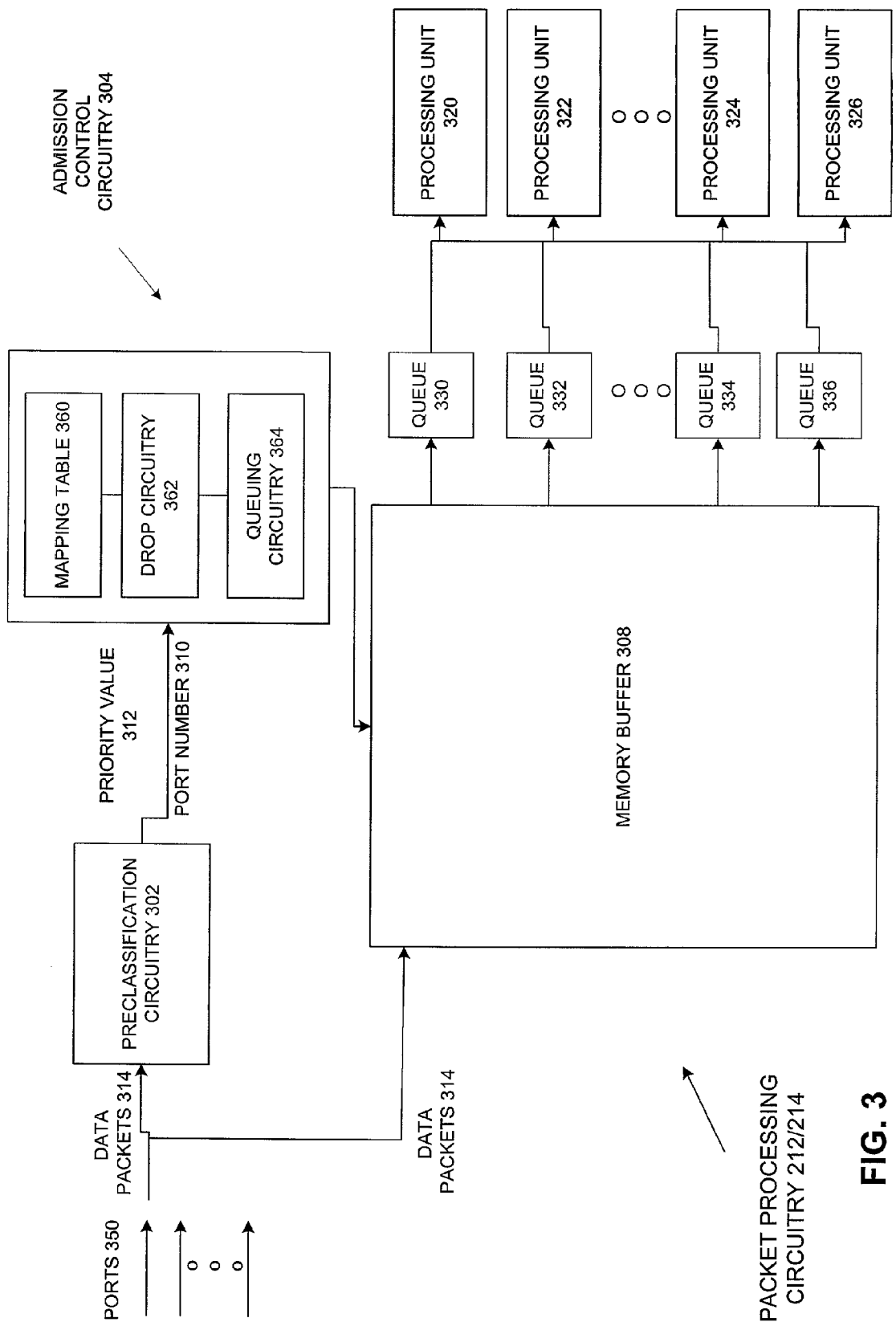
FIG. 3 illustrates a block diagram of packet processing circuitry 212*a–d* /214*a–d* (hereinafter "packet processing circuitry 212"), according to embodiments of the present invention.

FIG. 3 illustrates a block diagram of packet processing circuitry 212a –d/214a–d (hereinafter "packet processing circuitry 212"), according to embodiments of the present invention. As shown, packet processing circuitry 212 includes preclassification circuitry 302, which is coupled to receive data packets 314 from ports 350. Additionally, preclassification circuitry 302 is coupled to admission control circuitry 304. Admission control circuitry 304 is also coupled to memory buffer 308. Memory buffer 308 is coupled to queue 330, queue 332, queue 334 and queue 336. Each of queues 330–336 is coupled to processing unit 320, processing unit 322, processing unit 324 and processing unit 326. Additionally, as shown, the number of queues and processing units are not limited to the four shown in FIG. 3, as a greater or lesser number of such components can be incorporated into packet processing circuitry 212.

Preclassification circuitry 302 is coupled to receive data packets 314 from physical connection circuitry 210 for ingress packet processing circuitry 212 and from packet mesh 226 for egress packet processing circuitry 214. For the sake of simplicity and not by way of limitation, the block diagram of FIG. 3 illustrates the receipt of data packets from a single transmission line. In particular, embodiments of the present invention can include the receipt of a number of data packets from a number of different ports (either logical or physical) to which a number of transmission lines can be coupled (as shown by ports 350). Moreover, ports 350 are coupled to transmit data packets 314 to memory buffer 308.

Preclassification circuitry 302 is coupled to transmit data packets 314 and priority value 312 and port number 310 to admission control circuitry 304. Admission control circuitry 304 includes mapping table 360, drop circuitry 362 and queuing circuitry 364. As will be described in more detail below, mapping table 360 includes a number of admittance group identifiers. In an embodiment, upon determining a priority value and the port for a given packet, admission control circuitry 304 traverses mapping table 360 to determine the identification of an admission group for this packet. In one such embodiment, memory buffer 308 can store data packets into a maximum of 128 different admission groups. In an embodiment, upon determining a priority value and the port for a given packet, admission control circuitry 304 traverses mapping table 360 to determine a queue to associate with the data packet.

As will be described in more detail below, admission control circuitry 304 also includes drop circuitry 362 that removes data packets that are stored in memory buffer 308 upon determining that the number of data packets stored in memory buffer 308 are above a given threshold value (prior to being queued into one of queues 330–336 for processing by one of processing units 320–326). Admission control circuitry 304 also includes queuing circuitry 362 that controls the queuing of data packets from memory buffer 308 to queues 330–336.

Figure 4:
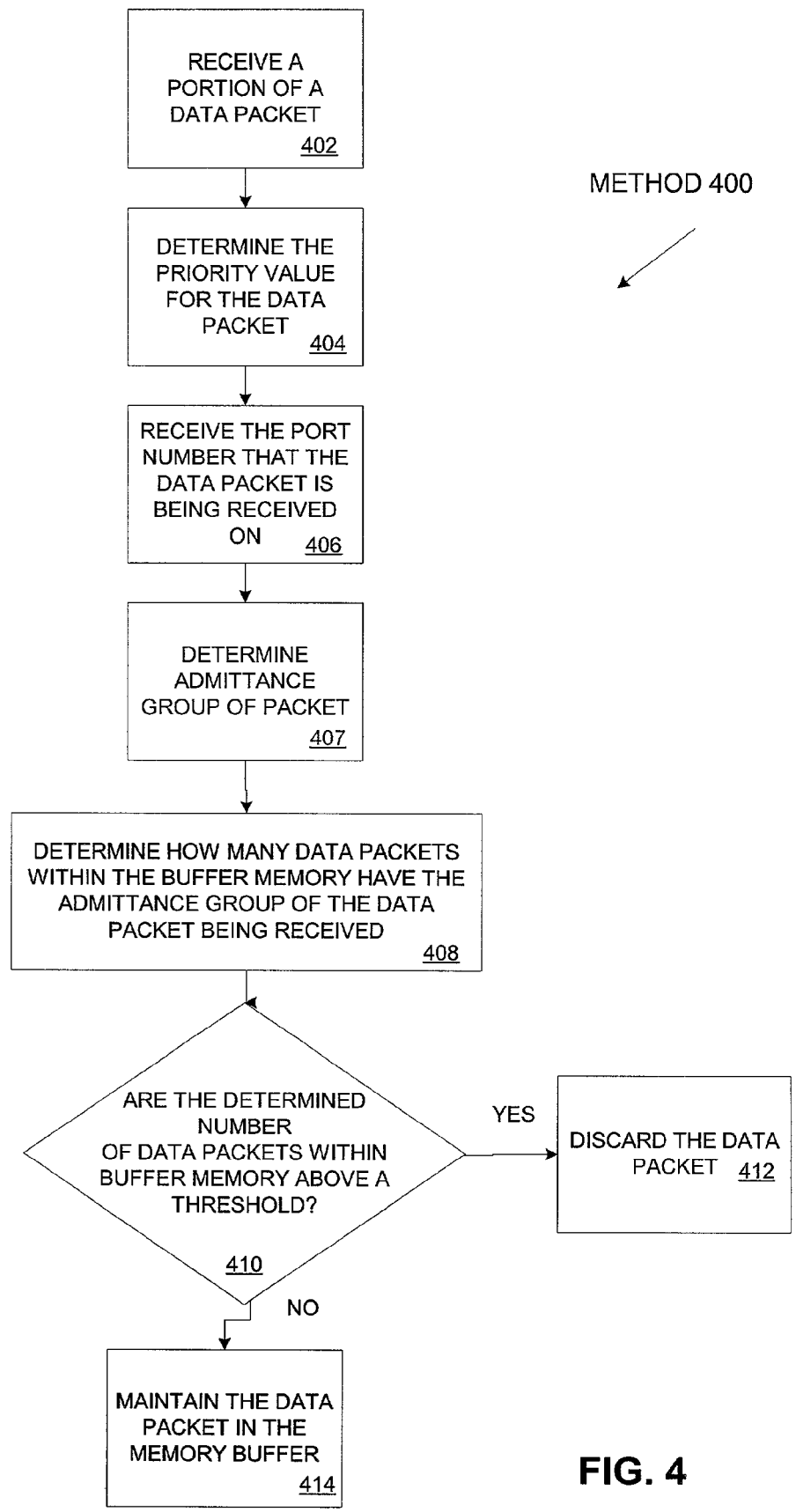
FIG. 4 illustrates a flow diagram of controlling admission of data packets into a network element, according to embodiments of the present invention.

The operation of packet processing circuitry 212 of FIG. 3 will now be described in more detail in conjunction with the flow diagram of FIG. 4. In particular, FIG. 4 illustrates a flow diagram of controlling admission of data packets into a network element, according to embodiments of the present invention. Method 400 is describes in terms of a single data packet being received on a single transmission line on a single port. This is for sake of simplicity and not by way of limitation as embodiments of the present invention can process a number of data packets on a number of transmission lines on a number of ports (both logical and physical). Additionally, method 400 is described in terms of the processing of data packets received from sources external to the network element through physical connection circuitry 210. However, embodiments of the present invention are not so limited, as method 400 can process data packets received from packet mesh 226 that is internal to the network element.

Method 400 commences with the receipt of a portion of a data packet, such as a byte, by preclassification circuitry 302, at process block 402. Returning to FIG. 2 to help illustrate, preclassification circuitry 302 could receive this portion of the data packet from another network element through physical connection circuitry 210. In one embodiment, this portion of the data packet can be received on one of four different physical port interfaces. Moreover, in one such embodiment, these portions of data packets can be received on 32 different logical port interfaces across the four different physical ports. The number of physical and/or logical port interfaces on which the portions of data packets can be received are by way of example and not by way of limitation, as a greater or lesser number of such port interfaces can be incorporated into embodiments of the present invention.

Figure 5:
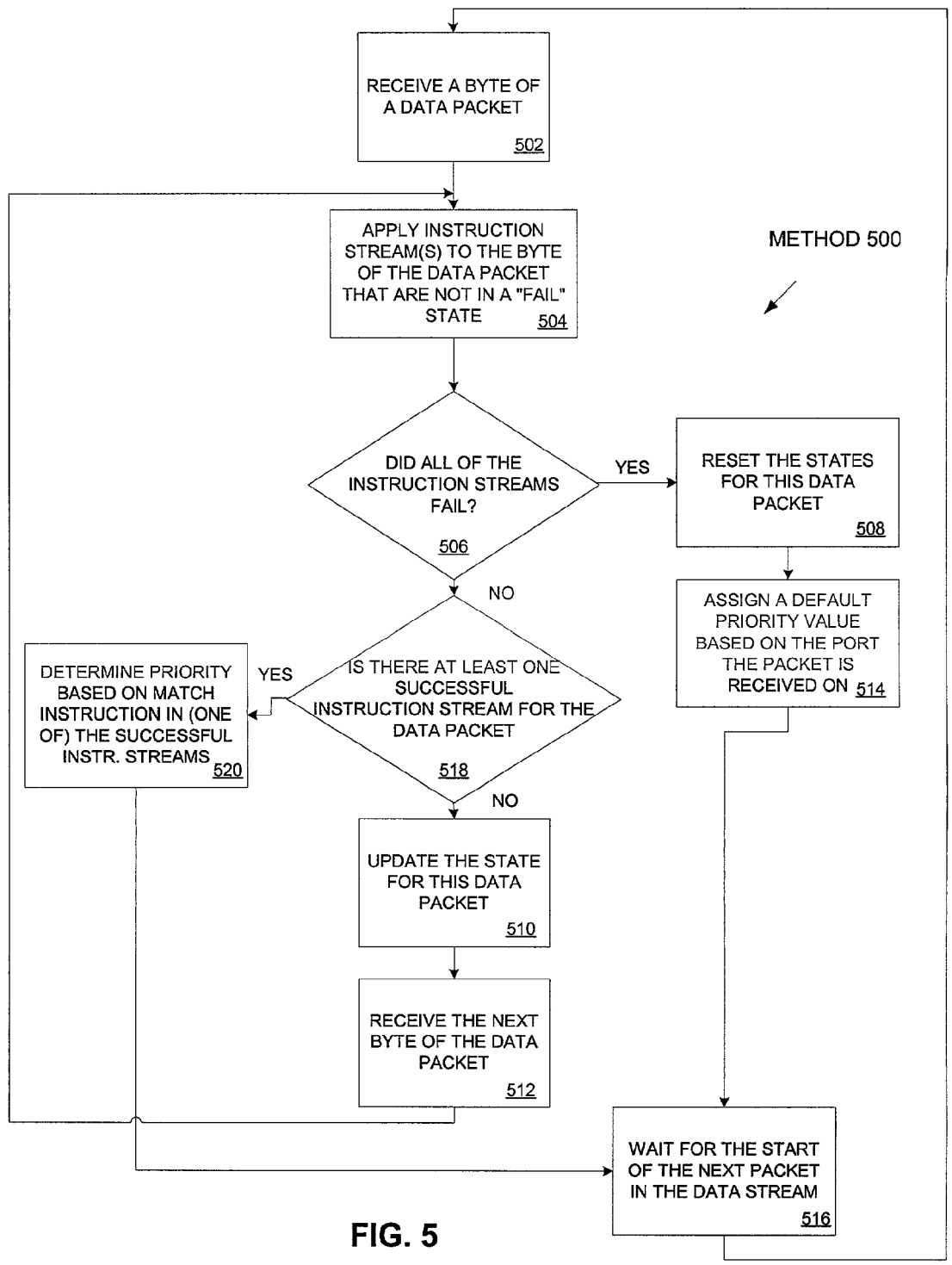
FIG. 5 illustrates a flow diagram for determining the priority value for a data packet, according to embodiments of the present invention.

Preclassification circuitry 302 determines the priority value for the data packet, at process block 404. FIG. 5 illustrates a flow diagram for determining the priority value for a data packet, according to embodiments of the present invention. Method 500 is described in terms of processing a byte of a data packet. However, embodiments of the present invention are not so limited, as other sizes of the data packet can be received and processed as provided within method 500.

Method 500 of FIG. 5 commences with the receipt of a byte of a data packet by preclassification circuitry 302, at process block 502. As described above, this byte of a data packet can be received from a number of different port interfaces (either physical or logical). Preclassification circuitry 302 applies zero to any number of different instruction streams to this byte, at process block 504. In one embodiment, the number of instruction streams to be applied to a given byte of a data packet ranges from 0–4. In particular with regard to process block 504, preclassification circuitry 302 applies those instruction streams that are not in a "fail" state, which is described in more detail below.

Figure 6:
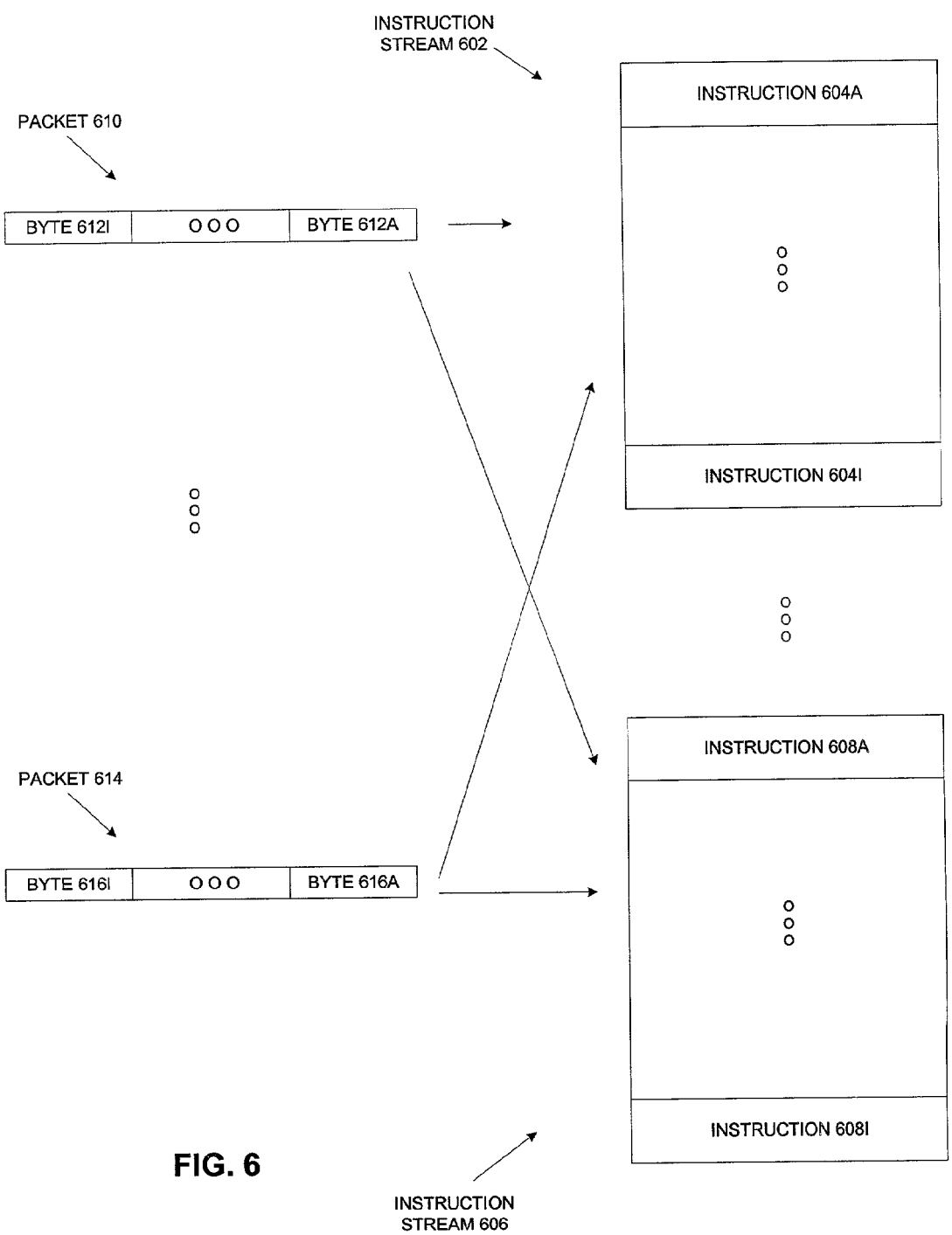
FIG. 6 illustrates the processing of bytes of a number of data packets by a number of instruction streams, according to embodiments of the present invention.

FIG. 6 illustrates the processing of bytes of a number of data packets by a number of instruction streams, according to embodiments of the present invention. The number of instruction streams, the number of instructions within the instruction streams, the number of packets and the number of bytes within packets shown in FIG. 6 are for the sake of simplicity and not by way of limitation, as they can be a lesser or greater number of such components within embodiments of the present invention.

FIG. 6 includes packets 610 and 614 that include bytes 612A–612I and bytes 616A–616I, respectively. FIG. 6 also includes instruction stream 602 and instruction stream 606. In an embodiment, the number of instruction streams that can be applied to a byte of a data packet is in a range of zero to four. Instruction stream 602 and instruction stream 606 include instructions 604A–604I and instructions 608A–608I, respectively. In one embodiment, the number of instructions within a given instruction stream is 16. Instruction streams 602 and 606 can be different types of circuitry and/or logic that represent the different instructions included therein.

In an embodiment, each of the instruction streams represent those instructions that assist in identifying whether the byte stream of a packet is of a given packet format. For example, one instruction stream could represent those instructions to help identify whether the byte stream is an Ethernet packet, while another instruction stream could represent those instructions to help identify whether the byte stream is an Internet Protocol (IP) packet. Other types of standards that could be represented by an instruction stream include, but are not limited to, Asynchronous Transfer Mode (ATM), voice over IP, Point-to-Point Protocol (PPP) and Multi-Protocol Label Switching (MPLS). As is known in the art, each packet format includes different values in different locations within the byte stream of the packet that help identify the packet as being of a given format. Accordingly, each instruction in the instruction stream looks at different bytes within the packet to determine if the packet is of a given format. For example, the fifth byte of a packet might have a value that is greater than 20, while the $10^{th}$ byte of the packet might have a value that is less than or equal to 200 for a given format. Therefore, the first instruction for this instruction stream would determine whether the fifth byte is greater than 20, while a second instruction in the same instruction stream would determine whether the $10^{th}$ byte of the packet is less than or equal to 200.

Figure 7:
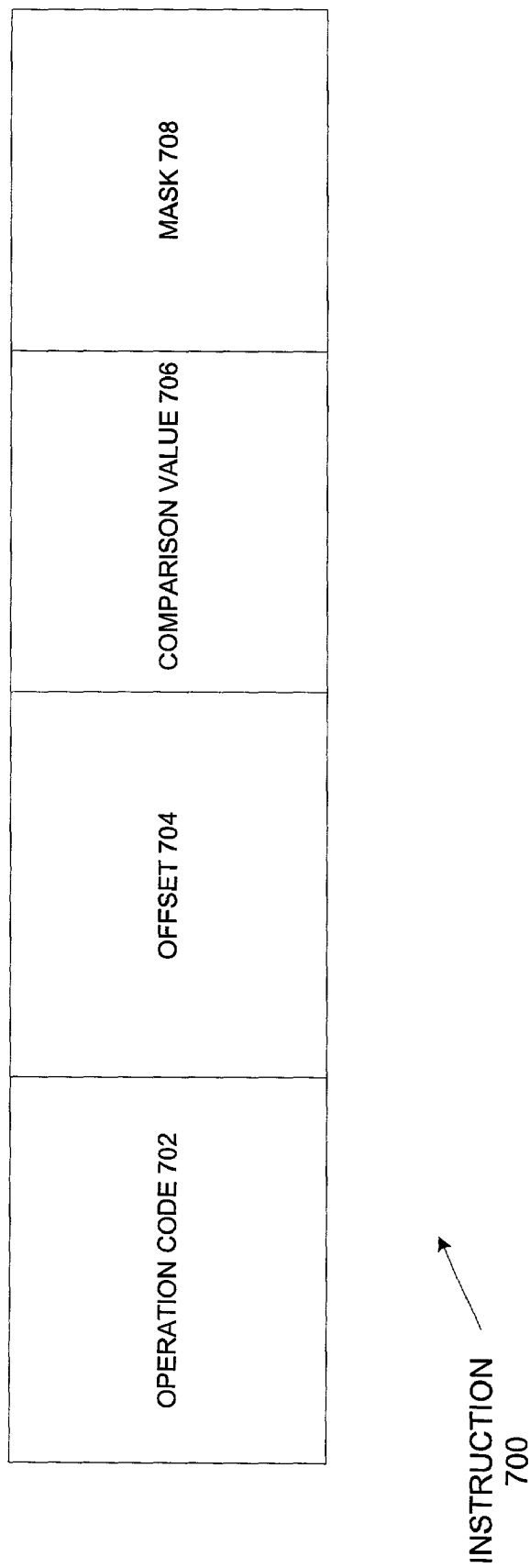
FIG. 7 illustrates an instruction with an instruction stream to be applied to portions of a data packet, according to embodiments of the present invention.

To help illustrate, FIG. 7 shows an instruction within an instruction stream to be applied to portions of a data packet, according to embodiments of the present invention. In particular, FIG. 7 illustrates instruction 700 that represents a format of one of instructions 604A–I and instructions 608A–I. Instruction 700 includes operation code 702. The types of operation codes that can be included in operation code 702 include, but are not limited to, different comparisons ("greater than", "greater than or equal to", "equal to", "less than or equal to", "less than" and "not equal to") and a match operation code. Offset 704 includes a value that represents the offset within the byte stream of the data packet where a value is located for processing by instruction 700. Additionally, instruction 700 includes comparison value 706 and mask 708. In operation, the value located by offset 704 within the byte stream of the data packet is masked by the value in mask 708 in order to mask out certain bits from this byte stream value. In one embodiment, this masking allows for the normalization across a number of different packet formats. This byte stream value that has been masked is then compared to comparison value 706 using the operation code within operation code 702. In an embodiment, a match operation code is employed in the last instruction in a given instruction stream. Accordingly, when the byte located at the value stored in offset 704 is received, the instruction stream is assumed to be matched to this given packet, and thereby considered the last instruction in the instruction stream.

Returning to FIG. 6 to help illustrate, instruction stream 602 could be determining if packet 610 were an IP packet. Accordingly, instruction 604A of instruction stream 602 could include a "less than" within operation code 702, a value of 10 in offset 704, a value of 100 in comparison value 706 and a value of zero in mask 708. Therefore, when applying instruction stream 602, when the 10$^{th}$ byte for the packet 610 is received (equating to the offset value stored in offset 704), the value of this 10$^{th}$ byte is masked with zero and the result compared to 100 (the value stored in comparison value 706) to determine if the value stored in the 10$^{th}$ byte is less than 100.

This application of an instruction within an instruction stream is not limited to one instruction stream, as any number of instruction streams could process the given byte within the packet. Returning to the example above to help illustrate, instruction 608B of instruction stream 606 could also include a different or same type of comparison for the same byte (i.e., the 10$^{th}$ byte) within packet 610, as this instruction stream could be determining if the packet were an Ethernet packet. For example, instruction 608B could provide an "equal" comparison to its comparison value 706 for this 10$^{th}$ byte.

As illustrated in FIG. 6, each of the byte streams of packets 610 and 614 can be applied to any of instruction streams 602 and 606. For example for byte 612B, preclassification circuitry 302 can apply instruction 604A of instruction stream 602 (which is associated with locating an Ethernet packet), while also applying instruction 608B of instruction stream 606 (which is associated with locating an IP packet). Accordingly, the instructions within any of the number of instruction streams can be applied to a given byte of a packet. For example, both the third instruction of instruction stream 602 and the 11$^{th}$ instruction of instruction stream 606 could be applied to byte 616A of packet 614 (assuming that byte 616A is not the first byte in the packet).

Returning to FIG. 5, method 500 continues at process decision block 506 wherein preclassification circuitry 302 determines if all of the instruction streams applied to the byte failed. In particular, an instruction stream has failed if a comparison within a given instruction fails. For example, if comparison value 706 has a value of 50, operation code 702 is "less than", the value stored in the byte identified by offset 704 is 51 and the mask is zero, the comparison would fail for this instruction and the instruction stream having this instruction would be in a "failed" state.

Upon determining that all instructions streams being applied to the given packet have failed, preclassification circuitry 302 resets the states for this data packet, at process block 508 (the states for a data packet are described in more detail below in conjunction with process block 510). Additionally, preclassification circuitry 302 assigns a default priority value based on the port that this packet is being received on, at process block 514. Because all of the instruction streams have failed, preclassification circuitry 302 is unable to determine the type for this packet. Therefore, a priority value is assigned depending on which port the packet is being received, as different ports can be assigned different levels of priority. Preclassification circuitry 302 waits for the first byte of the next packet in the data stream, at process block 516, and restarts the process at process block 502 to determine the type for a packet using the instruction streams.

In contrast, upon determining that not all of the instruction streams being applied to the given packet have failed, preclassification circuitry 302 determines whether at least one instruction stream is successful, at process decision block 518. In one embodiment, this determination is based on the execution of the match operation code instruction in the instruction stream. In particular, different instruction streams can be applied to a given packet in order to determine the type (e.g., Ethernet or IP) for the packet. Additionally, each instruction stream could have one to a number of different instructions to be applied to various bytes in the packet in order to determine if the instruction stream is "successful."

For example, in order to determine whether a packet is an 802.11Q Ethernet packet with a priority field, five different comparison instructions applied to different bytes in the packet may need to be executed successfully in order to assure that this is an Ethernet packet. For other types of packets, a fewer or greater number of instructions may be need to be applied to the different bytes in the packet. Therefore, in an embodiment, even though preclassification circuitry 302 may have only one instruction stream left that has not failed, the required number of instructions for this instruction stream will still be executed to ensure the type for the packet.

Upon determining that at least one instruction stream is successful, preclassification circuitry 302 determines the priority value for this packet based on the type of data packet, at process block 520. In particular, preclassification circuitry 302 is able to locate a priority value that is stored within the data packet based on its type. For example, in one embodiment, the priority value could be stored in byte 50 for a given type of packet, while being stored in byte 62 for a different type of packet. Accordingly, in one embodiment, the bytes within the data packets that the different instruction streams are processing are before the byte(s) that store the priority value. Preclassification circuitry 302 waits for the first byte of the next packet in the data stream, at process block 516, and restarts the process at process block 502 to determine the type for a packet using the instruction streams.

Upon determining that no instruction stream is successful, preclassification circuitry 302 updates the state for this packet, at process block 510. Among other information, the state for a given packet can include the status (such as "fail") of each instruction stream being applied to the given packet as well as those instructions that have been applied to the given packet and the results thereof for each of the different instruction streams.

In one embodiment, preclassification circuitry 302 stores 32 different states for 32 different packets that are being received and processed. In one such embodiment, preclassification circuitry 302 receives packets from 4 different physical ports such that a given port receives data that includes byte streams from 8 different packets that are being multiplexed together and processed accordingly. In one such embodiment, therefore, preclassification circuitry could receive the first 32 bytes of a first packet, followed by the first 32 bytes of a second packet and continues until the first 32 bytes of the eighth packet have been received and then begin receiving the second 32 bytes of the first packet and continues processing accordingly. Therefore, preclassification circuitry 302 can store and update a state for a number of different packets.

At process block 512, preclassification circuitry 302 receives the next byte in the data packet, and applies those instruction streams that are not in a "fail" state to the byte, at process block 504. As illustrated, this process continues until the data packet is identified and the priority value is located in the packet or until all of the instruction streams for this data packet have failed and a default value is assigned for the priority value. As illustrated, embodiments of preclassification circuitry 302 are able to identify the types of data packets being received on its different port interfaces independent of branch logic and circuitry, as the different instruction streams are able to identify such types with those failing instruction streams being discarded as the bytes of the packets are processed by the different instructions in these instruction streams.

Returning to FIG. 4, after determining the priority value for the data packet, at process block 404, preclassification circuitry 302 transmits this priority value to admission control circuitry 304. Additionally, admission control circuitry 304 receives port number 310, which is the number of the port that this data packet is received from, at process block 406. In one embodiment, port number 310 is received from preclassification circuitry 302. In other embodiments, port number 310 is received from other circuitry, logic or other sources (not shown).

In an embodiment, upon determining a priority value and the port for a given packet, admission control circuitry 304 traverses mapping table 360 to determine the identification of an admission group for this packet (i.e., an admittance group identifier), at process block 407. In one such embodiment, memory buffer 308 can store data packets into a maximum of 128 different admission groups. In an embodiment, upon determining a priority value and the port for a given packet, admission control circuitry 304 traverses the look-up table in memory attached thereto (not shown) to determine a queue to associate with the data packet.

Admission control circuitry 304 determines how many data packets stored in memory buffer 308 have the admittance group identifier that this data packet has, at process block 408. In one embodiment, admission control circuitry 304 queries memory buffer 308 to determine the number of data packets having this admittance group identifier. In another embodiment, admission control circuitry 304 stores this information in local memory (not shown).

Additionally, admission control circuitry 304 determines whether the number of data packets within memory buffer 308 having this admittance group identifier is above a threshold value. For example, in one embodiment, the components of packet processing circuitry 212 can be provisioned to only allow for the storage of 50 data packets (the threshold value) from admittance group 'one' into memory buffer 308.

Upon determining that storing this data packet into memory buffer 308 would cause the total number of data packets having this admittance group identifier to exceed a given threshold within memory buffer 308, drop circuitry 362 discards the data packet, at process block 412. Conversely, upon determining that storing this data packet into memory buffer 308 would not cause the total number of data packets having this combination of port number and priority value to exceed a given threshold within memory buffer 308, admission control circuitry 304 keeps the data packet stored in memory buffer 308, at process block 414.

In an embodiment, queuing circuitry 364 queues pointers to the data packets stored in memory buffer 308 into queues 330–336, depending on the queue associated with the given data packets. Processing units 320–326 shown in FIG. 3 extract and process the data packets stored in memory buffer 308 out from packet processing circuitry 212. Returning to FIG. 2 to help illustrate, for data packets being outputted from network elements 102–108 to, for example, another network element, these data packets can be outputted from egress packet processing circuitry 214 to physical connection circuitry 210. Additionally, for data packets being outputted to another line card through packet mesh 226, these data packets can be outputted from ingress packet processing circuitry 212 to packet mesh 226.

In an embodiment, processing units 320–326 can selectively process data packets stored in memory buffer 308, using queues 330–336. For example, processing units 320–326 could process all of the data packets from a given queue until this queue is empty and then process data packets from the other queues while the first queue remains empty. In another embodiment, processing units 320–326 could process a selected number of packets from a first queue and then process a selected number of packets from a second queue. For example, processing unit 320 could be programmed to process 15 data packets from queue 330 and then process 5 packets from queue 334, thereby processing the data packets in queues 330 and 336 in a round robin operation. The above examples of selective processing by processing units 320–326 is by way of example and not by way of limitation, as other types of selective processing can be incorporated into embodiments of the present invention.

Embodiments of the present invention describe the controlling of the admission of data packets into memory buffer 308 based on a priority value and the port number for a data packet. However, embodiments of the present invention are not so limited. For example, in another embodiment, this decision can be based on only the priority value for the data packet. Alternatively, in an embodiment, this decision can be based on only the port number for data packet. Other embodiments of the present invention can look to other criteria in reference to the incoming data packets to determine whether to store these data packets into memory buffer 308. For example, in another embodiment, the decision could be based on the source and/or destination of the data packet.

The line cards and control cards included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Embodiments of the present invention were described in terms of discrete processing elements, such as physical connection circuitry 210 or ingress packet processing circuitry 212, performing certain operations. However, this is by way of example and not by way of limitation. For example, in other embodiments, the operations described herein can be incorporated into a single processing element. In other embodiments, operations in one processing element may be performed in another of the described processing elements.

Thus, a method and apparatus for controlling the admission of data packets into a network element have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for controlling admittance of a data packet into a memory buffer, the method comprising:
   performing, prior to queuing the data packet for routing by a processor, the following:
      receiving a data packet from one of at least two different ports;
      determining a priority value within the data packet;
      determining an admittance group identifier for the data packet based on the priority value and the port the data packet was received; and
      admitting the data packet into the memory buffer, the memory buffer being associated with a group identified by the determined admittance group identifier; and
   queuing the data packet from the memory buffer to one of a number of queues for routing by the processor upon determining that a number of data packets stored in the memory buffer and having the admittance group identifier is not greater than a threshold value associated with the determined admittance group identifier,
   wherein determining the priority value within the data packet is preformed based on classifying the data packet as one of a number of packet formats,
   wherein classifying the data packet received from one of the at least two different ports comprises classifying the data packet using instructions in a number of instruction streams, wherein each of the number of instruction streams are associated with one of the number of packet formats,
   wherein each instruction comprises a first portion having an operation code and a second portion having a target result of an operation associated with the operation code, and wherein for at least one byte of each data packet, the method further comprises applying each instruction of each instruction stream by
      performing on the respective byte an operation indicated in the operation code of the first portion of the respective instruction, and
      comparing a result of the operation with the target result indicated in the second portion of the respective instruction to determine a format of the respective data packet.

2. The method of claim 1, further comprising discarding the data packet upon determining that the number of data packets stored in the memory buffer and having the admittance group identifier is greater than the threshold value.

3. The method of claim 2, wherein data packets of each group admitted into the memory buffer are limited to a predetermined maximum number of packets associated with each group, and wherein subsequent additional data packets are discarded if the associated group contains the predetermined maximum number of packets.

4. The method of claim 3, wherein data packets of each group admitted do not exceed the predetermined maximum number of packets associated with the respective group before being queued into one of the queues and processed by the processor for routing of the respective group.

5. The method of claim 1, wherein the number of packet formats are selected from the group consisting of Internet Protocol and Ethernet.

6. The method of claim 1, wherein determining the admittance group identifier includes traversing a table of admittance group identifiers based on the priority value and the port that the data packet was received from.

7. The method of claim 6, further comprising selectively outputting the data packets from the memory buffer through the number of queues based on the admittance group identifier.

8. The method of claim 1, wherein the data packet is admitted into the memory buffer if a number of data packets within a group identified by the admittance group identifier that are already admitted into the memory buffer does not exceed the threshold value associated with the respective group.

9. The method of claim 1, wherein the determined format of the data packet is used to determine a priority of the data packet, which is used to determine a group of data packets of which the data packet belongs.

10. The method of claim 1, wherein each instruction further comprises a third portion having an offset of the data packet from which the at least one byte is applied, wherein the operation is performed on the at least one byte located from an offset indicated by the third portion of the respective instruction.

11. The method of claim 10, wherein each instruction further comprises a fourth portion having a mask associated with the at least one byte indicated by the third portion to indicate which portion of the at least one byte is relevant.

12. The method of claim 11, further comprising masking the at least one byte using the mask of the respective instruction before performing the operation indicated by the operation code of the instruction.

13. A machine-readable storage medium storing instructions for controlling admittance of a data packet into a memory buffer, which when executed by a machine, causes the machine to perform operations comprising:
   performing, prior to queuing the data packet for routing by a processor, the following:
      receiving a data packet from one of at least two different ports;
      determining a priority value within the data packet;
      determining an admittance group identifier for the data packet based on the priority value and the port the data packet was received; and
      admitting the data packet into the memory buffer, the memory buffer being associated with a group identified by the determined admittance group identifier; and
   queuing the data packet from the memory buffer to one of a number of queues for routing by the processor upon determining that a number of data packets stored in the memory buffer and having the admittance group identifier is not greater than a threshold value associated with the determined admittance group identifier, wherein determining the priority value within the data packet is based on classifying the data packet as one of a number of packet formats, wherein classifying the data packet received from one of the at least two different ports comprises classifying the data packet using instructions in a number of instruction streams, wherein each of the number of instruction streams are associated with one of the number of packet formats, wherein each instruction comprises a first portion having an operation code and a second portion having a target result of an operation associated with the operation code, wherein for at least one byte of each data packet, the operations further comprise applying each instruction of each instruction stream by performing on the respective byte an operation indicated in the operation code of the first portion of the respective instruction, and comparing a result of the operation with the target result indicated in the second portion of the respective instruction to determine a format of the respective data packet.

14. The machine-readable storage medium of claim 13, further comprising discarding the data packet upon determining that the number of data packets stored in the memory buffer and having the admittance group identifier is greater than the threshold value.

15. The machine-readable storage medium of claim 14, wherein data packets of each group admitted into the memory buffer are limited to a predetermined maximum number of packets associated with each group, and wherein subsequent additional data packets am discarded if the associated group contains the predetermined maximum number of packets.

16. The machine-readable storage medium of claim 15, wherein data packets of each group admitted do not exceed the predetermined maximum number of packets associated with the respective group before being queued into one of the queues and processed by the processor for routing of the respective group.

17. The machine-readable storage medium of claim 13, wherein the number of packet formats are selected from the group consisting of Internet Protocol and Ethernet.

18. The machine-readable storage medium of claim 13, wherein determining the admittance group identifier includes traversing a table of admittance group identifiers based on the priority value and the port that the data packet was received from.

19. The machine-readable storage medium of claim 18, further comprising selectively outputting the data packets from the memory buffer through the number of queues based on the admittance group identifier.

20. The machine-readable storage medium of claim 13, wherein the data packet is admitted into the memory buffer if a number of data packets within a group identified by the admittance group identifier that are already admitted into the memory buffer does not exceed the threshold value, associated with the respective group.

21. The machine-readable storage medium of claim 13, wherein the determined format of the data packet is used to determine a priority of the data packet, which is used to determine a group of data packets of which the data packet belongs.

22. The machine-readable storage medium of claim 13, wherein each instruction further comprises a third portion having an offset of the data packet from which the at least one byte is applied, wherein the operation is performed on the at least one byte located from an offset indicated by the third portion of the respective instruction.

23. The machine-readable storage medium of claim 22, wherein each instruction further comprises a fourth portion having a mask associated with the at least one byte indicated by the third portion to indicate which portion of the at least one byte is relevant.

24. The machine-readable storage medium of claim 23, wherein the operartions further comprise masking the at least one byte using the mask of the respective instruction before performing the operation indicated by the operation code of the instruction.

25. A network element, comprising:

a processor; and a memory coupled to the processor for storing instructions, when executed from the memory, cause the processor to perform, prior to queuing the data packet for routing by the processor, the following:

receiving a data packet from one of at least two different ports, determining a priority value within the data packet, determining an admittance group identifier for the data packet based on the priority value and the port the data packet was received, and admitting the data packet into the memory buffer, the memory buffer being associated with a group identified by the determined admittance group identifier, and queue the data packet from the memory buffer to one of a number of queues for routing by the processor upon determining that a number of data packets stored in the memory buffer and having the admittance group identifier is not greater than a threshold value associated with the determined admittance group identifier, wherein determining the priority value within the data packet is performed based on classifying the data packet as one of a number of packet formats, wherein classifying the data packet received from one of the at least two different ports comprises classifying the data packet using instructions in a number of instruction streams, wherein each of the number of instruction streams are associated with one of the number of packet formats, wherein each instruction comprises a first portion having an operation code and a second portion having a target result of an operation associated with the operation code, and wherein for at least one byte of each data packet, the method further comprises applying each instruction of each instruction stream by performing on the respective byte an operation indicated in the operation code of the first portion of the respective instruction, and comparing a result of the operation with the target result indicated in the second portion of the respective instruction to determine a format of the respective data packet.

26. An apparatus, comprising:

means for performing, prior to queuing the data packet for routing by the processor, the following:

receiving a data packet from one of at least two different ports, determining a priority value within the data packet, determining an admittance group identifier for the data packet based on the priority value and the port the data packet was received, and admitting the data packet into the memory buffer, the buffer being associated with a group identified by the determined admittance group identifier; and means for queuing the data packet from the memory buffer to one of a number of queues for routing by the processor upon determining that a number of data packets stored in the memory buffer and having the admittance group identifier is not greater than a threshold value associated with the determined admittance group identifier, wherein determining the priority value within the data packet is performed based on classifying the data packet as one of a number of packet formats, wherein classifying the data packet received from one of the at least two different ports comprises classifying the data packet using instructions in a number of instruction streams, wherein each of the number of instruction streams are associated with one of the number of packet formats, wherein each instruction comprises a first portion having an operation code and a second portion having a target result of an operation associated with the operation code, and wherein for at least one byte of each data packet, the method further comprises applying each instruction of each instruction stream by performing on the respective byte an operation indicated in the operation code of the first portion of the respective instruction, and comparing a result of the operation with the target result indicated in the second portion of the respective instruction to determine a format of the respective data packet.

* * * * *